Jan. 25, 1955

E. P. LAMB 2,700,411

VEHICLE SEAT

Filed Aug. 27, 1949

INVENTOR.
Ernest P. Lamb
BY
Harness and Harris
ATTORNEYS.

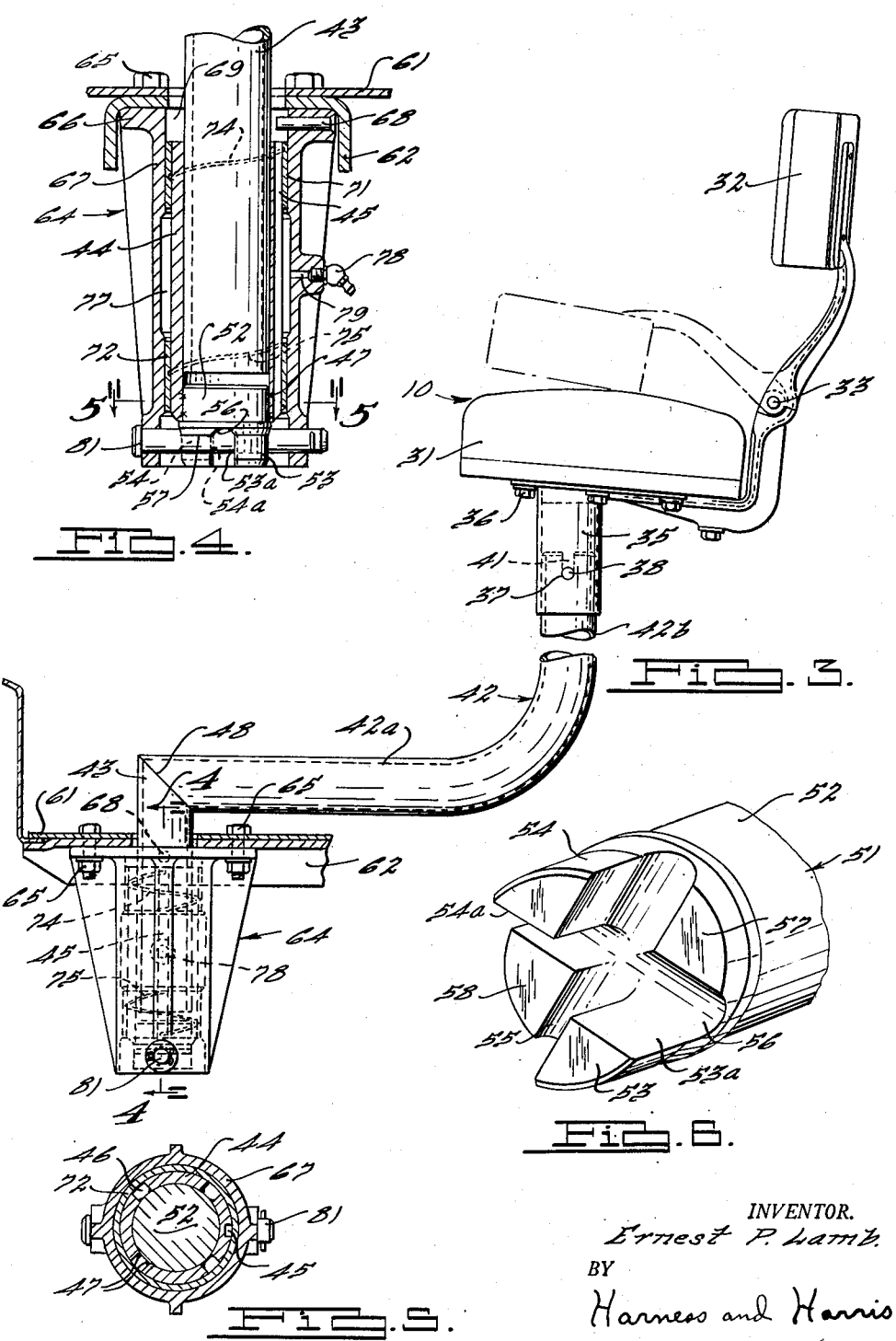

United States Patent Office 2,700,411
Patented Jan. 25, 1955

2,700,411

VEHICLE SEAT

Ernest P. Lamb, Grosse Pointe Park, Mich., assignor to Chrysler Corporation, Highland Park, Mich., a corporation of Delaware Application August 27, 1949, Serial No. 112,827

3 Claims. (Cl. 155—5)

This invention relates to a seating arrangement for a motor vehicle, and particularly to an arrangement whereby the driver's seat may be positioned directly behind the motor vehicle controls for sit-drive operation thereof, or be swung to an out-of-the-way position adjacent a side of the vehicle control compartment where it will not interfere with the stand-drive operation of the vehicle controls nor with passage through the control compartment of the vehicle.

It is a primary object of this invention to provide an improved and simplified form of pivotal mounting for a swingable vehicle seat that will control the swingable movement of the seat, provide anchoring means for retaining the seat in either of its limiting positions and yet permit ready detachment of the seat from the vehicle body.

It is a further object of this invention to provide an improved type of seat construction for a delivery truck or the like, which seat may be readily incorporated in the body and chassis of a conventional delivery truck of the door-to-door type.

It is an additional object of this invention to provide a novel manner of mounting a swingable driver's seat in the vehicle such that the seat is correctly positioned for and in no way interferes with the sit-drive operation of the vehicle, the seat being adapted to be moved forwardly to an out-of-the-way position to clear the passageway through the vehicle control compartment and provide an unobstructed area for stand-drive operation of the vehicle controls if such operation be desired.

It is another object of this invention to provide an improved, simplified form of pivotal mounting for the swingable supporting post of this swingable seat which mounting includes means to rotatably support as well as limit the movement of the swingable seat and also means to facilitate lubrication of the journalled portions of the swingable supporting post.

Other objects and advantages of this invention will become readily apparent from a reading of the following description and a consideration of the related drawings, wherein:

Figure 3 is a fragmentary side elevation of the seat and its supporting structure with certain portions thereof being shown in section;

Fig. 4 is a sectional elevational view taken along the lines 4—4 of Fig. 3 disclosing the pivotal mounting for the seat supporting post;

Fig. 5 is a sectional elevational view taken along the lines 5—5 of Fig. 4, disclosing the manner of assembling the journal post anchor plug in the lower end thereof; and Fig. 6 is a perspective view of the journal post anchor plug.

Figure 1:
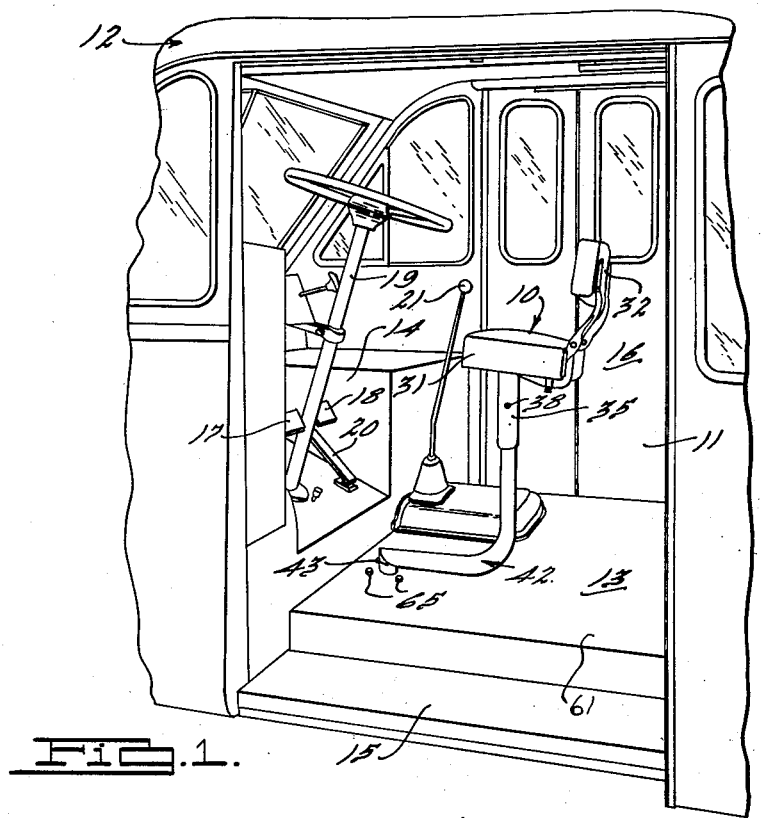
Fig. 1 is a fragmentary perspective view through an opened door of the driver's compartment of a motor vehicle of the type commonly used for door-to-door deliveries, the vehicle seat being shown in sit-drive position.

In the drawings, the seat unit 10 is shown mounted in the driver's compartment 11 of a motor vehicle body 12. The body 12 has a low level passageway 13 extending transversely of the body adjacent the rear side of the vehicle control well 14. The clearance between the floor of the passageway 13 and the vehicle roof above is such as to provide sufficient room for the vehicle operator to stand during operation of the vehicle if such should be his desire. The standing height clearance also permits the operator to walk through the passageway 13 without crouching so that he may quickly and easily load and unload the vehicle through the passageway 13. The passageway 13 may be entered from either side of the vehicle through the doorways 15 that are adapted to be closed by the folding doors 16. The conventional clutch and brake pedals 17 and 18 respectively, as well as the steering wheel 19 and engine accelerator pedal 20, are all located within the control well 14. The transmission gear shift control lever 21 is shown positioned in the transversely extending passageway 13 adjacent the right side of the control well 14. It is obvious that the gear shift lever may be positioned elsewhere such as on the steering column 19 if desired.

Figure 2:
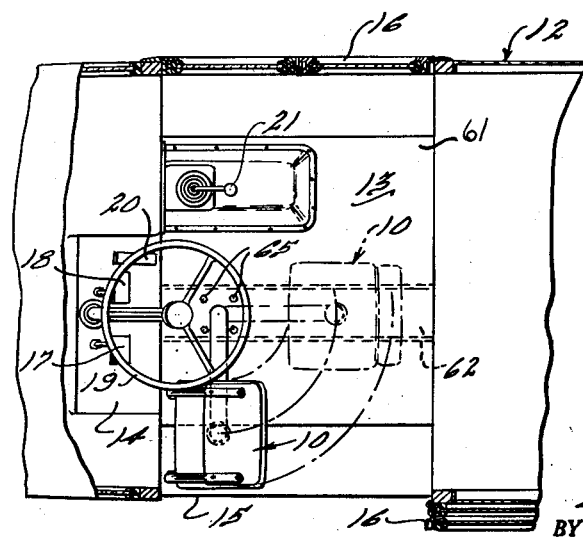
Fig. 2 is a plan view, partly in section, of the portion of the vehicle shown in Fig. 1, the seat being shown in full lines in its out-of-the-way or stand-drive position, with broken lines indicating the path of movement of the seat from sit-drive to stand-drive position.

The seat unit 10 (see Fig. 3) comprises a cushion element 31 that has the back support 32 hingedly connected thereto by the hinge post connections 33. Connections 33 permit the back support 32 to be folded down against the cushion element 31, as shown in broken lines in Fig. 3, when the seat unit is not being used to support a person. Connections 33 also limit the unfolding movement of the back support 32 to an arc of approximately ninety degrees so as to position the back support 32 in a substantially vertically disposed position when the back is unfolded and the seat arranged for use. The underside of cushion element 31 has a post receiving sleeve or collar 35 connected thereto by the bolts 36. Bolts 36 may be engaged with different longitudinally spaced apart portions of the underside of the cushion element 31 to provide means for longitudinal adjustment of the seat cushion unit relative to its supporting post 42. Collar 35 is preferably provided with a transversely extending pin bore 37 which is adapted to receive a pin 38. Pin 38 is arranged so that it may be seated in a slot 41 formed in the free upper end of the leg 42b of the substantially L-shaped seat supporting post 42. With the pin 38 engaged with the post slot 41 it is obvious that there cannot be relative rotation between the seat cushion unit 31 and its supporting post 42. This is desirable when the seat is supporting a person driving the vehicle for then there is no danger of the driver being swung around on the post 42 due to turning or lurching of the vehicle. However, by merely raising the cushion element 31 and its attached post receiving sleeve 35 a sufficient distance to disengage the pin 38 from the post slot 41, it is obvious that the seat element 31 can then be rotated on its supporting post 42. This feature is advantageous when the seat is not being used and is located in the out-of-the-way position at the forward side edge of the passageway 13 as shown in Fig. 2.

The seat supporting post 42 is substantially L-shaped and comprises the base leg 42a and side leg 42b. Base leg 42a has a depending post journal portion 43 fixed to the free end thereof by means of a welded connection 48 or the like. Fixed about the lower end of the post journal portion 43, by sweating, welding, or the like, is a cylindrically shaped journal sleeve 44. Sleeve 44 has a channel-shaped groove or slot 45 formed in its peripheral surface which groove extends lengthwise or longitudinally of the sleeve 44. Slot 45 is adapted to receive a seat positioning or guide pin 68, subsequently described in detail, during mounting of the seat unit in its supporting structure.

Mounted within the hollow lower end of the journal sleeve 44 is the anchor plug 51 (see Figs. 3–6). Plug 51 has a cylindrically shaped body portion 52 seated within the bore in the lower end of sleeve 44. Sleeve 44 is pierced with a number of transversely extending apertures 46 adjacent its lower end and these apertures provide openings adjacent the anchor plug body portion 52 which permit welding of the plug 51 to the sleeve 44 as indicated at 47. Obviously pin means or the like could be used to connect the plug 51 to the sleeve 44 instead of the welds 47. Extending longitudinally or axially from the lower, exposed end of the plug body portion 52 are a pair of diametrically disposed projections or fingers 53 and 54, respectively. The portions of the plug 51 extending circumferentially between the projections or fingers 53 and 54 are cut away in such a manner as to provide the two substantially semi-cylindrical grooves 55 and 56 respectively and the two flat bearing portions 57 and 58 respectively. Grooves 55 and 56 are positioned at substantially right angles to each other and each abuts a side face of each of the projections 53 and 54. Flat bearing surfaces 57 and 58 are formed on those portions of the plug between the projections 53 and 54 which are not a part of the grooves 55 and 56. The reasons for forming the axially projecting, exposed end of the plug 51 in the manner herein disclosed will become more readily apparent after a reading of the subsequent description of this invention.

Mounted beneath the floor 61 of the passageway 13 (see Figs. 3 and 4), so as to extend longitudinally of the vehicle, is a channel-shaped chassis frame member 62. Frame member 62 provides a rigid foundation member to carry the pedestal type seat post support 64. Pedestal 64 is fixed to the web portion of the channel member 62 by the bolt and nut connecting means 65.

The pedestal type post support 64 includes a plate-like base portion 66, from which there extends the cylindrically shaped, sleeve-like post socket 67. Mounted in the base portion 66 of the pedestal 64 is a positioning or guide pin 68. Pin 68 has the free end thereof projecting into and transversely of the cylindrical bore 69 that extends longitudinally through the pedestal 64. Pin 68 is adapted to be slidably engaged with the groove 45 in the post journal sleeve 44 when the seat post portion 43 is lowered into the bore 69 of the pedestal member 64. Fixed within the bore 69 in pedestal 64, adjacent the upper and lower ends thereof, are a pair of spaced apart, cylindrical, sleeve-type, bearings 71 and 72 respectively. Bearings 71 and 72 rotatably engage the journal sleeve 44 and prevent rocking of the seat supporting post 43 in its socket-like support. The inner bearing surfaces of the bearings 71 and 72 are each formed with spirally extending grooves 74 and 75 respectively which grooves provide means for readily passing lubricating material around the bearing faces. The central portion of the bore 69 in the socket member 67 is enlarged as shown at 77. This enlarged bore portion 77 has connected thereto through passage 79 a pressure type lubricating fitting 78. Fitting 78 provides means whereby bearing lubricating material may be forced into the bore portion 77 from where it can flow axially along the bore 69 in opposite directions so as to thoroughly lubricate both of the bearings 71 and 72.

Mounted in the lower end of the sleeve member 67 so as to extend across the bore 69 is a post support pin 81. Pin 81 is adapted to seat in one or the other of the grooves 55 or 56 of the post anchor plug 51 depending on whether the seat unit 10 is in its sit-drive or out-of-the-way position. From Fig. 4 it will be noted that the projections 53, 54 on the plug 51 straddle the pin 81 when the seat post portion 43 is mounted in the pedestal 64. Furthermore, from Fig. 6, it will be noted that the cut-away bearing surfaces 57, 58 and the grooves 55, 56 are so located between the fingers or projections 53 and 54 that the post 43 may be rotated through only an arc of approximately ninety degrees when the post anchor plug 51 has been seated on the support pin 81.

The pedestal construction herein disclosed is such as to insure the seat post portion 43 being mounted in its receiving socket bore 69 in only one way. This results from the fact that the post portion 43 must be positioned so that the groove 45 will engage the pin 68 as post portion 43 is lowered into the bore 69. Unless the pin 68 and groove 45 are aligned it is impossible to lower the post portion 43 into bore 69. Consequently there is only one position in which the post 43 can be mounted in the pedestal 64 and when mounted in this manner then the plug projections or studs 53, 54 straddle the pin 81 in the manner shown in Fig. 4. Furthermore, when so mounted the seat can swing only between its sit-drive position rearwardly of the vehicle controls and its out-of-the-way position forwardly of and laterally outward from its sit-drive position due to the movement limiting operation of the studs 53, 54. The seat post can never be positioned in the post receiving socket in such a manner as to permit the seat to be swung laterally inwardly in a counterclockwise direction from its normal sit-drive position. This results from the fact that with the projecting fingers 53, 54 straddling the pin 81 in the manner shown in Fig. 4, the only possible forward swing movement of the post is in a clockwise direction so as to move the seat to a forwardly and laterally outwardly disposed position. During rotation of the seat unit from its sit-drive position to its out-of-the-way position, the bearing portions 57 and 58 of the anchor plug 51 will ride across the top of pin 81 until the side face 53a of finger 53 abuts against the side of pin 81 and limits the clockwise rotation of post 43 and its associated anchor plug 51. The side face 54a of the anchor finger 54 will simultaneously be moved into engagement with the opposite side of the pin 81 to assist the stud 53 in limiting and controlling the rotation of the seat post. In either of the limiting positions of swingable movement of the seat it is obvious that the pin 81 will seat in one or the other of the grooves 55 and 56 respectively. These groove seats 55, 56 provide means for retaining the seat in either of its selected positions and prevent unintended rotation of the seat. The grooves 55, 56 may be easily cammed out of engagement with the pin 81 by applying a torque load to the post 43.

From the above description of this invention, it is thought to be obvious that the structure disclosed provides a seat unit that is particularly adapted for use in motor vehicles wherein the driver may desire to operate the vehicle controls from either a sitting or a standing position. When the seat is to be used to support the vehicle operator, it may be positioned rearwardly of and aligned with the vehicle controls for easy operation thereof. When arranged in the sit-drive position the seat supporting structure provides anchor means that prevent unintended movement of the seat from its sit-drive position. The seat supporting structure is so designed that it readily permits movement of the seat from the sit-drive position to an out-of-the-way stand-drive position adjacent the forward side edge of the transverse passageway through the truck. The seat supporting structure also includes means to anchor the seat in its stand-drive position. When positioned in the out-of-the-way stand-drive position the seat does not interfere with access to the vehicle controls nor with movement through the transversely extending passageway 13. This permits ready operation of the vehicle controls for standing drive and also permits the vehicle operator to mount and dismount from the vehicle with the greatest of ease even though he may be carrying a load of bulky material at the time. Movement of the seat from the out-of-the-way position to the sit-drive position requires nothing more than the application of a counterclockwise torque load to the seat unit and then the pin 81 will be cammed out of engagement with the plug groove 56 and will ride across the bearing faces 57, 58 into the groove 55 which anchors the seat in its sit-drive position. The substantially L-shaped seat supporting post is designed so that there will be no portion of the post that could possibly interfere with the operation of the vehicle controls when the seat is in either of its two limiting positions. The pedestal support 64 for the rotatable seat post 42 is adapted to be readily connected to any conventional low-level passageway floor in a manner that will conceal the support and prevent it from obstructing movement through the passageway.

I claim:

1. A seat unit adapted to be mounted in the driver's compartment of a motor vehicle adapted for sit-drive and stand-drive operation comprising a body supporting cushion element, a substantially L-shaped cushion supporting post formed from interconnected side leg and base leg portions, said cushion element being mounted on the free end of the post side leg portion, a supporting post journal portion depending from the free end of the base leg of the supporting post, said post journal portion having a groove extending longitudinally along the peripheral surface thereof diametrically disposed, axially extending, fingers projecting from the free end thereof, and intersecting, normally disposed, diametrically extending, anchor grooves formed in the free end thereof, said anchor grooves being arranged to extend intermediate the said fingers, and a pedestal-type support rotatably mounting the post journal portion comprising a base member with a depending sleeve having a bore therethrough receiving the post journal portion, a guide pin mounted in said pedestal having portions thereof extending into and transversely of said sleeve bore adapted to be slidably received in the longitudinally extending groove in said post journal portion, and a post support pin mounted in said pedestal support so as to extend transversely of said sleeve bore, said support pin being arranged to support the free end of the post journal portion with the said fingers straddling said support pin to limit the rotational movement of said seat supporting post in either of two opposed directions.

2. A seat unit adapted to be mounted in the driver's compartment of a motor vehicle adapted for sit-drive and stand-drive operation comprising a body supporting cushion element, a substantially L-shaped cushion supporting post formed from interconnected side leg and base leg portions, said cushion element being mounted on the free end of the post side leg portion, a supporting post journal portion depending from the free end of the base leg of the supporting post, said post journal portion having a groove extending longitudinally along the peripheral surface thereof, diametrically disposed, axially extending, fingers projecting from the free end thereof, and intersecting, normally disposed, diametrically extending, anchor grooves formed in the free end thereof, said anchor grooves being arranged to extend intermediate the said fingers, and a pedestal-type suport rotatably mounting the post journal portion comprising a base member with a depending sleeve having a bore therethrough receiving the post journal portion, a guide pin mounted in said pedestal having portions thereof extending into and transversely of said sleeve bore adapted to be slidably received in the longitudinally extending groove in said post journal portion, and a post support pin mounted in said pedestal support so as to extend transversely of said sleeve bore, said support pin being arranged to support the free end of the post journal portion with the said fingers straddling said support pin to limit the rotational movement of said seat supporting post in either of two opposed directions, said supporting pin also being arranged for engagement with the anchor grooves in said post journal portion to provide means for restraining movement of said seat from either of its limiting positions.

3. A seat unit adapted to be mounted in the driver's compartment of a motor vehicle adapted for sit-drive and stand-drive operation comprising a body supporting cushion element, a substantially L-shaped cushion supporting post formed from interconnected side leg and base leg portions, said cushion element being mounted on the free end of the post side leg portion, a supporting post journal portion depending from the free end of the base leg of the supporting post, said post journal portion having a groove extending longitudinally along the peripheral surface thereof, diametrically disposed, axially extending, fingers projecting from the free end thereof, and intersecting, normally disposed, diametrically extending, anchor grooves formed in the free end thereof, said anchor grooves being arranged to extend intermediate the said fingers, and a pedestal-type support rotatably mounting the post journal portion comprising a base member with a depending sleeve having a bore therethrough receiving the post journal portion, a guide pin mounted in said pedestal having portions thereof extending into and transversely of said sleeve bore adapted to be slidably received in the longitudinally extending groove in said post journal portion, and a post support pin mounted in said pedestal support so as to extend transversely of said sleeve bore, said support pin being arranged to support the free end of the post journal portion with the said fingers straddling said support pin to limit the rotational movement of said seat supporting post in either of two opposed directions, said supporting pin also being arranged for engagement with the anchor grooves in said post journal portion to provide means for restraining movement of said seat from either of its limiting positions, said sleeve having a passage therethrough intersecting said bore and providing means for lubricating the engaged surfaces of said post journal portion and said sleeve.

References Cited in the file of this patent

UNITED STATES PATENTS

| | | |
|---|---|---|
| 1,315,086 | Brunker | Sept. 2, 1919 |
| 1,337,221 | Hansen | Apr. 20, 1920 |
| 1,610,065 | Meyer | Dec. 7, 1926 |
| 1,742,037 | Kleinschmidt | Dec. 31, 1929 |
| 1,990,748 | Oberkircher et al. | Feb. 12, 1935 |
| 2,242,138 | Muma | May 13, 1941 |

FOREIGN PATENTS

| | | |
|---|---|---|
| 26,155 | Great Britain | 1912 |
| 110,190 | Great Britain | Oct. 12, 1917 |
| 242,072 | Great Britain | Nov. 5, 1925 |